United States Patent
Higa et al.

(10) Patent No.: US 11,740,912 B2
(45) Date of Patent: Aug. 29, 2023

(54) OPERATION SUPPORT APPARATUS, SYSTEM, METHOD, AND NON-TRANSITORY COMPUTER READABLE MEDIUM STORING PROGRAM

(71) Applicant: NEC Corporation, Tokyo (JP)

(72) Inventors: Ryota Higa, Tokyo (JP); Junya Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 200 days.

(21) Appl. No.: 17/425,832

(22) PCT Filed: Feb. 1, 2019

(86) PCT No.: PCT/JP2019/003549
§ 371 (c)(1),
(2) Date: Jul. 26, 2021

(87) PCT Pub. No.: WO2020/157948
PCT Pub. Date: Aug. 6, 2020

(65) Prior Publication Data
US 2022/0318029 A1 Oct. 6, 2022

(51) Int. Cl.
*G06F 9/44* (2018.01)
*G06F 9/445* (2018.01)
*G06F 11/34* (2006.01)

(52) U.S. Cl.
CPC ...... *G06F 9/44505* (2013.01); *G06F 11/3495* (2013.01)

(58) Field of Classification Search
CPC .................. G06F 1/32; G06F 9/44; G06F 1/12
See application file for complete search history.

(56) References Cited

U.S. PATENT DOCUMENTS

2018/0224809 A1 8/2018 Liu et al.
2019/0369963 A1* 12/2019 Utsumi .................. G06F 7/575
(Continued)

FOREIGN PATENT DOCUMENTS

JP 2018-092439 A 6/2018
JP 2018-092511 A 6/2018
(Continued)

OTHER PUBLICATIONS

Japanese Office Action for JP Application No. 2020-569305 dated Apr. 19, 2022 with English Translation.
(Continued)

*Primary Examiner* — Keshab R Pandey
(74) *Attorney, Agent, or Firm* — Sughrue Mion, PLLC

(57) ABSTRACT

An operation support apparatus (100) includes a storage unit (110) configured to store time-series data (111), and operation information (112), a specification unit (120) configured to specify a plurality of change points in a change trend of the states from the time-series data (111), and specify each of a plurality of time windows as one of a plurality of operating modes in the target system, and an operation-set generation unit (130) configured to extract, for each of the plurality of time windows, a set of operations performed at a time included in that time window from the operation information (112), generate an operating-mode operation set (113) in which the operating modes corresponding to the respective time windows are associated with the extracted set of operations, and stores the generated operating-mode operation set (113) in the storage unit (110).

13 Claims, 11 Drawing Sheets

(56) References Cited

U.S. PATENT DOCUMENTS

2020/0084717 A1* 3/2020 Höglund .............. H04W 68/02
2021/0271582 A1* 9/2021 Liu ..................... G06F 11/079

FOREIGN PATENT DOCUMENTS

JP     2018-128854 A    8/2018
JP     2016-190048 A    11/2018

OTHER PUBLICATIONS

International Search Report for PCT Application No. PCT/JP2019/003549, dated May 14, 2019.

* cited by examiner

211

| time | $p \in s$ | $q \in s$ | LOCATION r |
|---|---|---|---|
| 1 | 0.10 | 0.80 | r1 |
| 2 | 0.12 | 0.78 | r1 |
| 3 | 0.13 | 0.59 | r1 |
| 4 | 0.14 | 0.46 | r1 |
| ... | ... | ... | ... |
| N | 0.11 | 0.77 | r1 |

212

| time | $a_1^*$ | $a_2^*$ | $a_3^*$ | ... |
|---|---|---|---|---|
| 1 | ○ | | | |
| 3 | | | ○ | |
| ... | | | | |
| N | | ○ | | |

| time | p ∈ s | q ∈ s | LOCATION r |
|---|---|---|---|
| 1 | 0.10 | 0.80 | r1 |
| 2 | 0.12 | 0.78 | r1 |
| 3 | 0.13 | 0.59 | r1 |
| 4 | 0.14 | 0.46 | r1 |
| ⋮ | ⋮ | ⋮ | ⋮ |
| N | 0.11 | 0.77 | r1 |

| time window | OPERATING MODE | OPERATION SET | | |
|---|---|---|---|---|
| 1 ~ 3 | M11 | $a_{1-1}$ | $a_{1-2}$ | $a_{1-3}$ |
| 4 ~ 5 | M12 | $a_{2-1}$ | | |
| ⋮ | ⋮ | ⋮ | | |
| n-1 ~ n | Mn | $a_{n-1}$ | $a_{n-2}$ | |

Fig. 10

OPERATION SUPPORT APPARATUS, SYSTEM, METHOD, AND NON-TRANSITORY COMPUTER READABLE MEDIUM STORING PROGRAM

This application is a National Stage Entry of PCT/JP2019/003549 filed on Feb. 1, 2019, the contents of all of which are incorporated herein by reference, in their entirety.

TECHNICAL FIELD

The present disclosure relates to an operation support apparatus, a system, a method, and a non-transitory computer readable medium storing a program.

BACKGROUND ART

An operation system such as an infrastructure system for water supply is operated by having an operator perform a management operation on a daily basis based on an operation plan prepared in advance. In recent years, due to a shortage of experienced operators, there has been a strong demand for operation support for inexperienced operators. Note that it is possible to obtain operation plan-based plan information by using a prediction model that simulates the above-described system.

Patent Literature 1 discloses a technique related to an operation support apparatus for a plant, a mechanical apparatus, or the like. This operation support apparatus collects process data related to the operating state of an apparatus to be monitored, and constructs a prediction model that has learnt the characteristics of the apparatus in the operating range thereof based on the collected process data. Therefore, the operation support apparatus can obtain results of simulations of the operation of the apparatus to be monitored by using the prediction model, and use the obtained results as plan information.

CITATION LIST

Patent Literature

Patent Literature 1: Japanese Unexamined Patent Application Publication No. 2018-092511

SUMMARY OF INVENTION

Technical Problem

However, there is a problem that it is difficult for an inexperienced operator to understand appropriate and specific management operations based solely on the plan information obtained from the prediction model disclosed in Patent Literature 1 or the like. One of the reasons for the problem is that plan information often indicates a target state of a target system and does not indicate operations for making the target system reach the target state. Further, the management operations for an operation system (a facility) are complicated and diversified. Therefore, even when an operator checks history of operations, it is difficult for him/her to select operations corresponding to the plan information from those in the history of operations.

The present disclosure has been made in order to solve the above-described problem and an object thereof is to provide an operation support apparatus, a system, a method, and a program for enabling an operator or the like to easily understand a set of appropriate and specific operations based on an operation plan of a target system.

Solution to Problem

An operation support apparatus according to a first aspect of the present disclosure includes:

a storage unit configured to store time-series data obtained by measuring states of a target system controlled according to a plurality of operations performed by an operator, and operation information of at least one of the plurality of operations;

a specification unit configured to specify a plurality of change points in a change trend of the states from the time-series data, and specify each of a plurality of time windows as one of a plurality of operating modes in the target system, the plurality of time windows being separated at at least one of the plurality of change points; and an operation-set generation unit configured to extract, for each of the plurality of time windows, a set of operations performed in that time window from the operation information, generate an operating-mode operation set in which the operating modes corresponding to the respective time windows are associated with the extracted set of operations, and store the generated operating-mode operation set in the storage unit.

An operation support system according to a second aspect of the present disclosure includes:

a storage unit configured to store time-series data obtained by measuring states of a target system controlled according to a plurality of operations performed by an operator, and operation information of at least one of the plurality of operations;

a specification unit configured to specify a plurality of change points in a change trend of the states from the time-series data, and specify each of a plurality of time windows as one of a plurality of operating modes in the target system, the plurality of time windows being separated at at least one of the plurality of change points; and an operation-set generation unit configured to extract, for each of the plurality of time windows, a set of operations performed in that time window from the operation information, generate an operating-mode operation set in which the operating modes corresponding to the respective time windows are associated with the extracted set of operations, and store the generated operating-mode operation set in the storage unit.

In an operation support method according to a third aspect of the present disclosure, a computer performs processes including:

specifying, from time-series data obtained by measuring states of a target system controlled according to a plurality of operations performed by an operator, a plurality of change points in a change trend of the states;

specifying each of a plurality of time windows as one of a plurality of operating modes in the target system, the plurality of time windows being separated at at least one of the plurality of change points;

extracting, for each of the plurality of time windows, a set of operations performed in that time window from operation information of at least one of the plurality of operations;

generating an operating-mode operation set in which the operating modes corresponding to the respective time windows are associated with the extracted set of operations; and storing the generated operating-mode operation set in a storage device.

An operation support program according to a fourth aspect of the present disclosure causes a computer to perform:

a process of specifying, from time-series data obtained by measuring states of a target system controlled according to a plurality of operations performed by an operator, a plurality of change points in a change trend of the states;

a process of specifying each of a plurality of time windows as one of a plurality of operating modes in the target system, the plurality of time windows being separated at at least one of the plurality of change points;

a process of extracting, for each of the plurality of time windows, a set of operations performed in that time window from operation information of at least one of the plurality of operations;

a process of generating an operating-mode operation set in which the operating modes corresponding to the respective time windows are associated with the extracted set of operations; and a process of storing the generated operating-mode operation set in a storage device.

Advantageous Effects of Invention

According to the above-described aspects, it is possible to provide an operation support apparatus, a system, a method, and a program for enabling an operator or the like to easily understand a set of appropriate and specific operations based on an operation plan of a target system.

BRIEF DESCRIPTION OF DRAWINGS

FIG. 4 shows an example of time-series data and operation history data according to the second example embodiment;

FIG. 9 shows an example of specifications of operating modes according to the second example embodiment;

FIG. 10 shows an example of an operating-mode operation set according to the second example embodiment.

DESCRIPTION OF EMBODIMENTS

Figure 1:
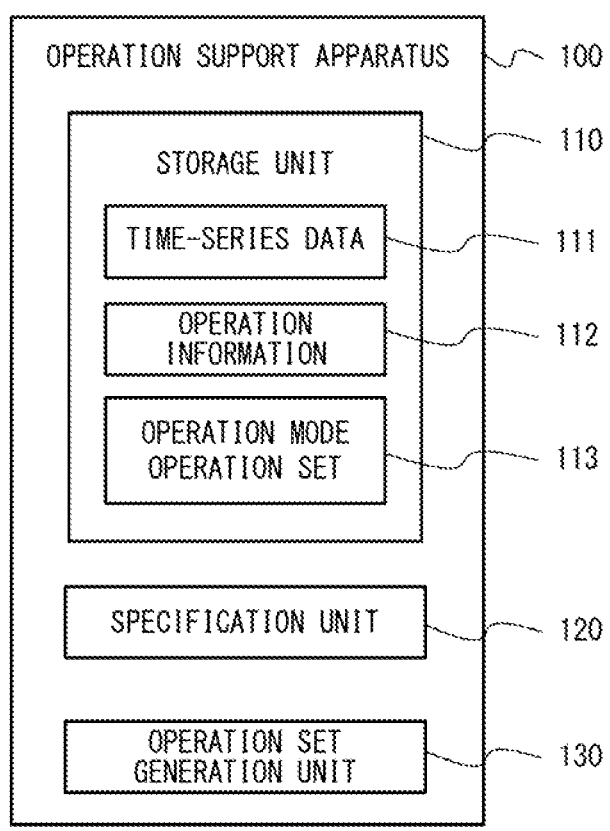
FIG. 1 is a block diagram showing an overall configuration of an operation support apparatus according to a first example embodiment.

Example embodiments according to the present disclosure will be described hereinafter in detail with reference to the drawings. The same or corresponding elements are denoted by the same reference numerals (or symbols) throughout the drawings, and redundant explanations are omitted as appropriate for clarifying the explanation.

First Example Embodiment

FIG. 1 is a block diagram showing an overall configuration of an operation support apparatus 100 according to a first example embodiment. The operation support apparatus 100 is an information processing system for supporting an operator who operates a target system (not shown). Note that the target system is a system which is controlled according to a plurality of operations performed by an operator based on an operation plan created in advance, and is, for example, an operation system such as an infrastructure system for water supply. Further, the operation support apparatus 100 is implemented by at least one information processing apparatus.

The operation support apparatus 100 includes a storage unit 110, a specification unit 120, and an operation-set generation unit 130. The storage unit 110 stores time-series data 111, operation information 112, and an operating-mode operation set 113. The time-series data 111 is a data string which is obtained by measuring states of the target system, and in which at least measurement values (values indicating states) are associated with their measurement times. Note that as the measurement time, an arbitrary unit for specifying a time, such as year, month, date, hour, minute, and second, can be used. The time-series data 111 may include, for example, measurement values such as flow rates, pressures, electric power, amounts of oil, or oil pressures. Further, the time-series data 111 may be associated with location information indicating a place where measured values are obtained, and/or a place or the like where the target system is located. Further, it is assumed that the time-series data 111 is, for example, data that was measured by a sensor or the like used for monitoring the target system and stored in the storage unit 110 in advance.

The operation information 112 is a set of at least one of a plurality of operations performed for the target system by the operator and a time(s). That is, the operation information 112 may be information in which at least information indicating operations and times are associated with each other. Note that for the time, an arbitrary unit for specifying a time, such as year, month, date, hour, minute, and second, can be used. Therefore, it is assumed that the operation information 112 includes, for example, a record of operations actually performed for the target system by the operator, an operation history (an operation log), and instructions of operation details (operation instructions) specifying execution times thereof for the operator irrespective of whether or not the operations were actually performed. Note that the "operation" is performed on an input device of an apparatus or the like for controlling the target system. Examples of the operation include, but are not limited to, pressing a specific button, turning a specific dial to a predetermined position, pulling a specific lever, setting a specific setting value, and inputting specific information using a keyboard or the like.

The operating-mode operation set 113 is information generated by the operation-set generation unit 130 (which will be described later), and may not be stored in the storage unit 110 at the beginning.

The specification unit 120 specifies a plurality of change points in a change trend of states from the time-series data 111. Then, the specification unit 120 specifies each of a plurality of time windows, which are separated at at least one of the plurality of change points, as one of a plurality of operating modes in the target system. Note that the operating mode is information for identifying at least a specific time window from other time windows adjacent to that specific time window. Further, the same type of an operating mode may be specified a plurality of times for a plurality time windows that are not adjacent to each other. For example, both of Monday morning and Tuesday morning may be specified as operational modes of the same type. Note that it is assumed that the time window includes at least one or more minimum units for unit system of the "(measurement) time" defined for the above-described time-series data 111 and the operation information 112.

The operation-set generation unit 130 extracts, for each of the plurality of time windows, a set of operations performed at times included in that time window from the operation information 112. Further, the operation-set generation unit 130 generates, for each of the time windows, an operating-mode operation set 113 in which the operating mode corresponding to that time window is associated with the extracted set of operations, and stores the generated operating-mode operation set 113 in the storage unit 110. Therefore, in the operating-mode operation set 113, at least one operation is associated with one operating mode. Further, the set of operations may also include an order in which the operations included therein are performed.

Figure 2:
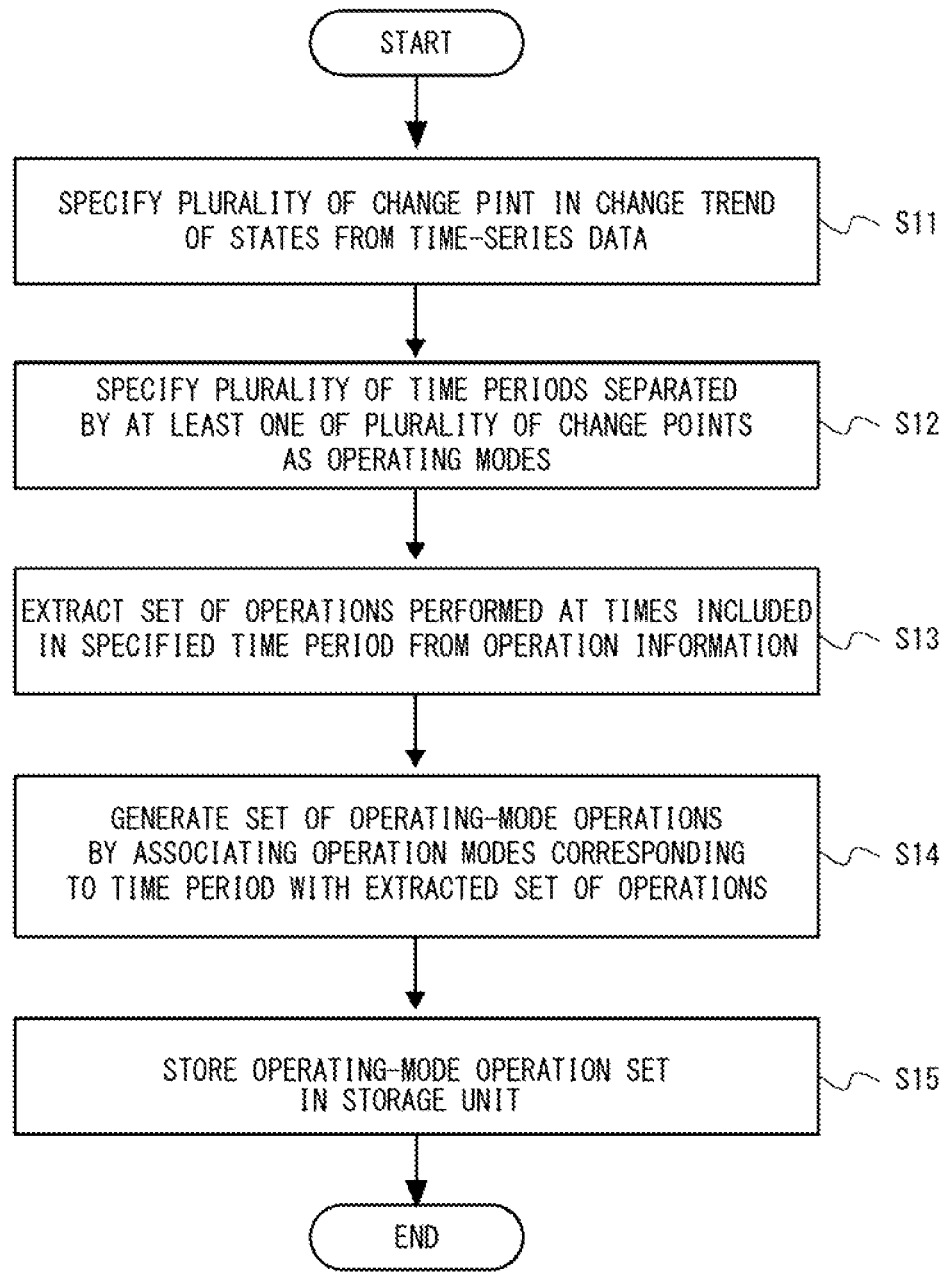
FIG. 2 is a flowchart showing a flow of an operation support method according to the first example embodiment.

FIG. 2 is a flowchart showing a flow of an operation support method according to the first example embodiment. Firstly, the specification unit 120 specifies a plurality of change points in a change trend of states from the time-series data 111 (S11). Next, the specification unit 120 specifies each of the plurality of time windows, which are separated at at least one of the plurality of change points, as one of a plurality of operating modes in the target system (S12).

Then, the operation-set generation unit 130 extracts, for each of the plurality of time windows, a set of operations performed at times included in that time window from the operation information 112 (S13). Next, the operation-set generation unit 130 generates, for each of the time windows, an operating-mode operation set 113 in which the operating mode corresponding to that time window is associated with the extracted set of operations (S14). After that, the operation-set generation unit 130 stores the generated operating-mode operation set 113 in the storage unit 110 (S15).

As described above, in this example embodiment, we have paid attention to the fact that a change trend of states of a target system changes as an operator operates the target system based on an operation plan. That is, the state of the target system constantly changes, and change trends (change patterns) appear at regular intervals. Further, the state of the target system does not necessarily change immediately in response to an operation, and in some cases, the change trend gradually changes with the elapse of a certain time. Alternatively, there is a possibility that the operator continues a predetermined set of operations in order to maintain the change trend of the states of the target system constant. Therefore, it can be considered that the operator performs a set of operations in order to change the target system to a target state thereof in a time window indicated by the operation plan. Further, the period during which the change trend of the specific target state is maintained is called an operating mode. Therefore, the operation support apparatus 100 separates the time window based on the time at which the change trend of the states of the target system in the time-series data 111 changes (i.e., based on the change point), and regards each of the separated time windows as an operating mode. Then, the operation support apparatus 100 extracts a set of operations performed at times included in the time window indicated by the operating mode from the operation information 112, and generates an operating-mode operation set 113 by associating the operating mode with the set of operations. In the case in which the operation information is history information, the operation support apparatus 100 extracts a set of operations performed in a time window indicated by an operating mode from the history information. Alternatively, in the case in which the operation information is instructions of operation details (operation instructions) specifying execution times thereof for the operator, the operation support apparatus 100 extracts a set of operation instructions scheduled in a time window indicated by an operating mode from the operation instructions. Alternatively, in the case in which both history information and operation instructions are included in the operation information, the operation support apparatus 100 may extract operations and/or operation instructions associated with times included in a time window indicated by an operating mode from the history information and/or the operation instructions. Therefore, the operator to whom the operating-mode operation set 113 has been presented can understand a set of operations for each operating mode. Further, the operating mode also corresponds to the operation plan as described above. Therefore, according to this example embodiment, it is possible to enable an operator or the like to easily understand a set of appropriate and specific operations based on an operation plan of a target system.

Note that the information processing apparatus 1 includes a processor, a memory, and a storage device (not shown). Further, a computer program including instructions or the like for performing the processes of the operation support method according to this example embodiment is stored in the storage device. Further, the processor loads the computer program from the storage device into the memory and executes the loaded computer program. In this way, the processor implements the functions of the specification unit 120 and the operation-set generation unit 130.

Alternatively, each of the specification unit 120 and the operation-set generation unit 130 may be implemented by dedicated hardware. Further, some or all of the components of each unit may be implemented by a general-purpose or special-purpose circuit (circuitry), a processor or the like, or a combination thereof. They may be formed by a single chip, or may be formed by a plurality of chips connected to each other through a bus. Some or all of the components of each unit may be implemented by a combination of the above-described circuit or the like and a program. Further, as the processor, a CPU (Central Processing Unit), a GPU (Graphics Processing Unit), an FPGA (field-programmable gate array), or the like may be used.

Further, when some or all of the components of the operation support apparatus 100 are implemented by a plurality of information processing apparatuses, circuits, or the like, the plurality of information processing apparatuses, the circuits, or the like may be disposed in one place or arranged in a distributed manner. For example, the information processing apparatuses, the circuits, and the like may be implemented as a client-server system, a cloud computing system or the like, or a configuration in which the apparatuses or the like are connected to each other through a communication network. Alternatively, the functions of the operation support apparatus 100 may be provided in the form of SaaS (Software as a Service).

Second Example Embodiment

Problems to be solved by the present disclosure will be described hereinafter in detail. It has been considered that an actual management operation to implement a plan information (a target state) of a target system is embodied and is specified not only by the plan information but also by experience of an experienced operator(s) who has acquired skill according to the surrounding environment and operating conditions of the facility (the system). That is, it is considered that even when the same operation is performed according to the same plan information, but at different facilities, the presence/absence of some of operations in the operation set, the order thereof, and/or the degree of the adjustment and the like thereof are different. They are also called know-how, knacks, or the like based on the experience of skilled operators.

However, in many cases, records of operations performed by skilled operators have not been sufficiently accumulated, i.e., have been just partially accumulated. For example, operations have been recorded only on Mondays, and/or only major operations among those performed in certain time windows have been recoded. In particular, in many cases, optimal operations (setting values, tuning levels, and operation times) unique to each facility are not recorded. Therefore, there is a problem that know-how is unlikely to be conveyed to other operators.

Further, in the case in which operations (actions) for implementing plan information are not obvious, it is impossible to create an appropriate prediction model. Further, creating a model of the whole network of a facility using a precise simulator requires a high cost, and its construction takes a long time. Therefore, under the existing technology, there is a limit to the generation of a precise prediction model for a facility.

Therefore, a second example embodiment is one that has been conceived to solve at least one of the above-described problems, and has the below-shown configuration in addition to the configuration in the first example embodiment. That is, the specification unit preferably specifies each of a plurality of patterns that are obtained from the time-series data by performing a pattern analysis thereon as a change trend of the states, and specifies a time at a boundary of each of the patterns as the change point. In this way, for example, it is possible to appropriately detect a separation point of an actual operating mode from the shape of a waveform pattern of time-series data.

Further, the specification unit preferably specifies, among the plurality of patterns, patterns whose change trends have a degree of similarity therebetween equal to or higher than a predetermined value as operating modes of the same type. In this way, similar patterns can be aggregated and regarded as the same operating mode, so that it is possible to detect a set of common operations and thereby to recognize a set of more general operations.

Further, the specification unit preferably integrates two or more patterns adjacent to each other into one pattern when a degree of similarity between their change trends is equal to or higher than a predetermined value, and specifies a time at a boundary of the integrated pattern as the change point. In this way, it is possible to specify a larger unit as one operating mode.

Further, it is assumed that the storage unit further stores an operation instruction for the operator based on an operation plan that is planned in advance within a period corresponding to the time-series data. In this case, the operation-set generation unit extracts a set of operations performed in the time window, and extracts an operation instruction corresponding to the time window from the operation instructions when no operation corresponding to the time window exists in the operation information. Further, the operation-set generation unit preferably generates the operating-mode operation set by associating the extracted operation instruction with the operating mode corresponding to the time window. In this way, even when the history of operations is insufficient, it is possible to associate, for each operating mode, a minimum set of operations with that operating mode, and thereby to provide information useful for inexperienced operators.

Further, it is assumed that the storage unit further stores external environment data including a plurality of pieces of environment data each of which corresponds to a respective one of a plurality of environment indexes. In this case, the operation support apparatus preferably further includes a tree generation unit that generates an action tree in which each of the operating modes is classified by using each of the plurality of environment indexes as a branching condition. In this way, since the operating modes are automatically classified, it becomes easy to specify an appropriate operating mode according to the plurality of environment indexes.

Further, the tree generation unit may generate and output the action tree as visualization information. In this way, the operator can easily specify an appropriate operating mode from the plurality of environment indexes.

Alternatively, the operation support apparatus may further include a visualization unit that generates and outputs visualization information of the operating-mode operation set. In this way, the operator can easily understand a set of operations for each operating mode.

Further, the operation support apparatus preferably further includes a model generation unit that generates, based on the time-series data and the operating-mode operation set, an operator model, which is configured to derive a set of operations performed by the operator from the state of the target system, for each of the operating modes. By generating an operator model for each operating mode as described above, it is possible to make a highly accurate prediction.

Further, the operation support apparatus may further include an operation presentation unit that inputs, in response to the designation of a target state of the target system in a time window in the future, the target state to the operator model in the operating mode corresponding to the time window in the future, derives a set of operations therefrom, and outputs the derived set of operations. In this way, an inexperienced operator can easily understand know-how of skilled operators.

Further, the operation support apparatus may further include a learning unit that trains a simulator for predicting a state of the target system by using the time-series data and the operating-mode operation set. In this case, the model generation unit preferably generates the operator model based also on the trained simulator. In this way, the accuracy of the operator model can be further improved.

Figure 3:
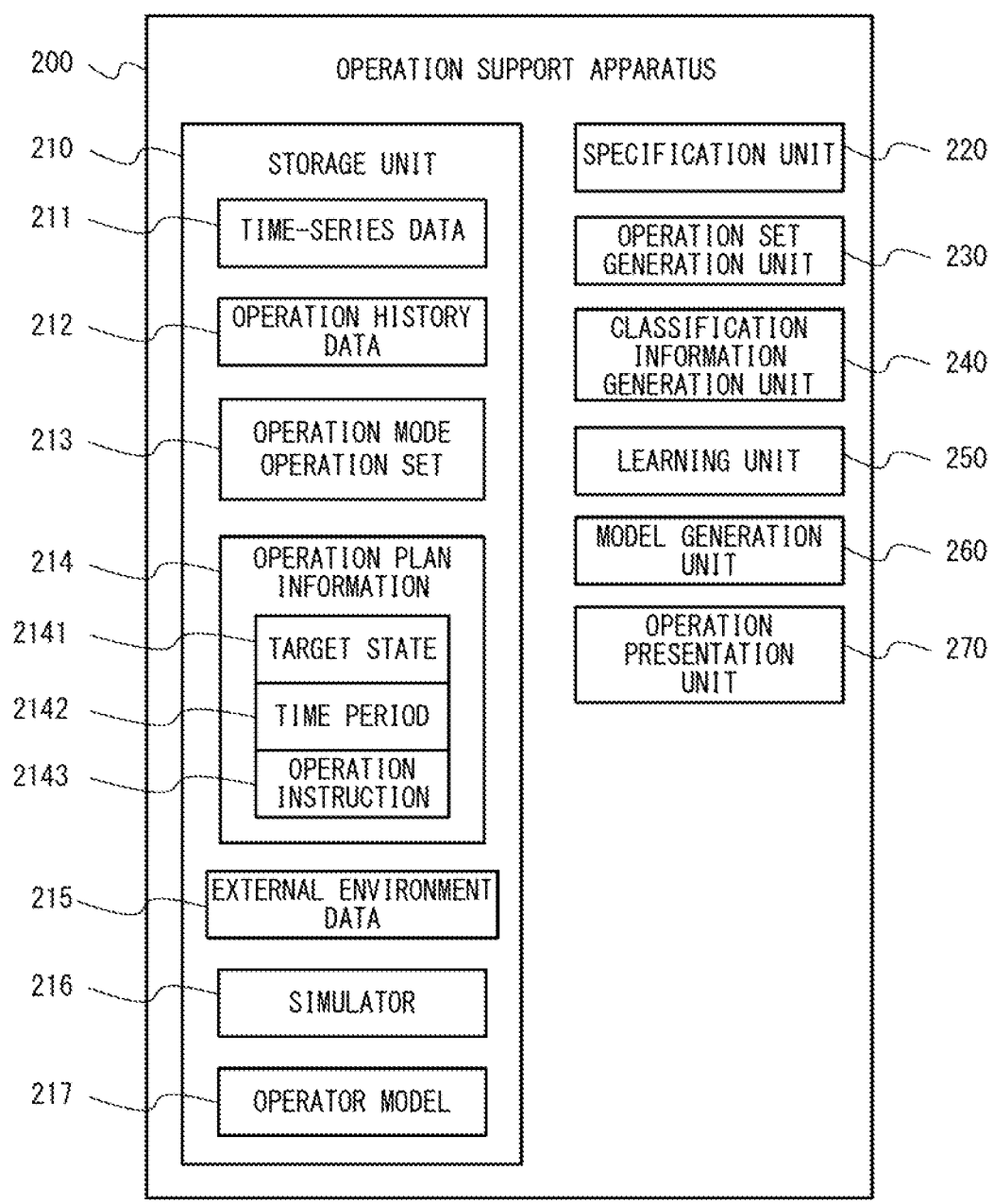
FIG. 3 is a block diagram showing a configuration of an operation support apparatus according to a second example embodiment.

FIG. 3 is a block diagram showing a configuration of an operation support apparatus 200 according to the second example embodiment. The operation support apparatus 200 is an improved version of the above-described operation support apparatus 100, and can be regarded as an operation support system implemented by at least one information processing apparatus. The operation support apparatus 200 includes a storage unit 210, a specification unit 220, an operation-set generation unit 230, a classification information generation unit 240, a learning unit 250, a model generation unit 260, and an operation presentation unit 270.

The storage unit 210 is an example of the above-described storage unit 110, and stores time-series data 211, operation history data 212, an operating-mode operation set 213, operation-plan information 214, external environment data 215, a simulator 216, and an operator model 217. The time-series data 211 is similar to the above-described time-series data 111, and the operation history data 212 corresponds to the history information included in the above-described operation information 112. Further, the operating-mode operation set 213 is similar to the above-described operating-mode operation set 113. Therefore, the operation history data 212 is data in which at least information indicating operations and times at which these operations are performed are associated with each other.

FIG. 4 shows an example of the time-series data 211 and the operation history data 212 according to the second example embodiment. The time-series data 211 in the example shown in FIG. 4 shows that a flow rate p, a pressure q, and a location r are associated with each other for each measurement time. Further, the operation history data 212 in the example shown in FIG. 4 indicates that one of operations $a^*_1$, $a^*_2$, $a^*_3$, and so on is associated with a time at which that operation was performed. Further, FIG. 4 shows that records of performed operations in the operation history data 212 do not necessarily correspond to measured values in the time-series data 211. For example, in some cases, the interval of measurement in the time-series data 211 is different from the interval of recording in the operation history data 212. Note that the interval of recording may be shorter than the interval of measurement. Further, two or more operations may be recorded at the same execution time in the operation history data 212.

The description will be continued by referring to FIG. 3 again. The operation-plan information 214 is information indicating an operation plan that was planned in advance within a period corresponding to the time-series data 211. In the operation-plan information 214, a target state 2141, a time window 2142, and an operation instruction 2143 are associated with each other. The target state 2141 is a target value of a state to which the state of the target system should be changed in the corresponding time window 2142. The target state 2141 may be states of a plurality of indexes. The time window 2142 is a width of a time during which the state of the target system should be changed to and maintained in the corresponding target state 2141. The operation instruction 2143 is information indicating an operation that the operator should perform in order to satisfy the corresponding target state 2141 and the time window 2142. The operation instruction 2143 may be information indicating an operation included in the operation history data 212, or may be an abstract instruction rather than the operation. Further, the operation instruction 2143 is not indispensable in this example embodiment. Note that any operation instruction 2143 that is associated with a specific time within the time window 2142 can be regarded as an example of the above-described operation information 112.

Figure 5:
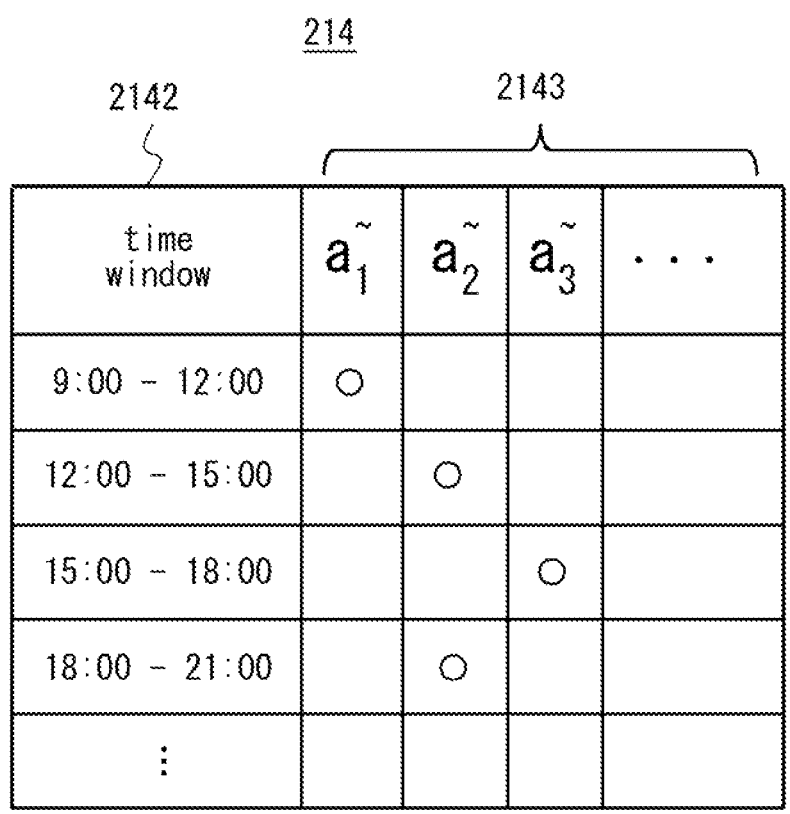
FIG. 5 shows an example of operation-plan information according to the second example embodiment.

FIG. 5 shows an example of the operation-plan information 214 according to the second example embodiment. The operation-plan information 214 may include an overall plan indicating a long-term target state or the like for the target system and individual plans including an operation instruction for each of a plurality of time windows in a day. FIG. 5 shows an example of individual plans. In the example shown in FIG. 5, one of operations $\tilde{a}_1$, $\tilde{a}_2$, $\tilde{a}_3$, and so on, which are the operation instructions 2143, is associated with one of plurality of time windows 2142. Note that although an example in which a couple of hours are used as a unit for the time, the range of the time is not limited to this example. Further, although the width of the time window 2142 is wider than the interval of recording of the execution time in the operation history data 212, the interval of recording of the execution time may be wider than that of the time window 2142. The operation instruction 2143 may include two or more operations in the same time window.

The description will be continued by referring to FIG. 3 again. The external environment data 215 is a set of external environment indexes that may affect the operation of the target system and time-series measured values. The environment indexes are, for example, seasons, days of the week, time windows, weather information (a weather, a temperature, and a humidity), and the like. The external environment data 215 according to this example embodiment preferably includes at least two indexes.

The simulator 216 is a prediction model for predicting the state of the target system, and is a model expression such as a function defined by parameters and variables. The simulator 216 receives operations (behavior) performed by the operator, and outputs the state of the target system by performing calculation using predetermined parameters.

The operator model 217 is a prediction model for deriving a set of operations performed by the operator from the state of the target system, and is a model expression such as a function defined by parameters and variables. The operator model 217 receives the state of the target system, and outputs a set of operations performed by the operator by performing calculation using predetermined parameters.

The specification unit 220 is an example of the above-described specification unit 120, and specifies each of a plurality of patterns that are obtained from the time-series data 211 by performing a pattern analysis thereon as a change trend of the states, and specifies a time at a boundary of each of the patterns as a change point. Further, the specification unit 220 specifies, among the plurality of patterns, patterns whose change trends have a degree of similarity therebetween equal to or higher than a predetermined value as operating modes of the same type. Further, the specification unit 220 integrates two or more patterns adjacent to each other into one pattern when a degree of similarity between their change trends is equal to or higher than a predetermined value, and specifies a time at a boundary of the integrated pattern as a change point.

The operation-set generation unit 230 extracts an operation instruction corresponding to the time window from the operation instructions 2143 when no operation corresponding to the time window specified by the specification unit 220 exists in the operation history data 212. Then, the operation-set generation unit 230 generates an operating-mode operation set 213 by associating the extracted operation instruction with the operating mode corresponding to the time window.

The classification information generation unit 240 is an example of the tree generation unit, and generates an action tree in which each of the operating modes is classified by using each of the plurality of environment indexes in the external environment data 215 as a branching condition. Further, the classification information generation unit 240 generates and outputs the action tree as visualization information. For example, the classification information generation unit 240 displays the action tree in a display apparatus (not shown) of the operation support apparatus 200.

Note that the operation support apparatus 200 may output information other than the action tree. For example, the operation support apparatus 200 may further include a visualization unit that generates and outputs visualization information of the operating-mode operation set 213 (other than the action tree thereof).

The learning unit 250 trains the simulator 216 for predicting the state of the target system by using the time-series data 211 and the operating-mode operation set 213, and stores the trained simulator 216 in the storage unit 210.

The model generation unit 260 generates, based on the time-series data 211 and the operating-mode operation set 213, an operator model 217, which is configured to derive a set of operations performed by an operator from the state of the target system, for each of the operating modes, and stores the generated operator models 217 in the storage unit 210. Further, the model generation unit 260 may generate the operator model 217 based also on the simulator 216 trained by the learning unit 250.

The operation presentation unit 270 inputs, in response to the designation of the target state 2141 of the target system in the time window in the future, the target state 2141 to the operator model 217 in the operating mode corresponding to the time window in the future, derives a set of operations therefrom, and outputs the derived set of operations. Note that the operation presentation unit 270 may externally receive the designation of the operating mode, select an operator model 217 corresponding to the designated operating mode, derive (predict) a set of operations by the selected operator model 217, and output the derived set of operations. Alternatively, the operation presentation unit 270 may receive time information indicating a time window immediately before the time window in which the set of operations are predicted, external environment data and the state of the target system in the time information, the designation of an operating mode, and the like. In such a case, the operation presentation unit 270 derives (predicts) a set of operations by the operator model 217 corresponding to the designated information, and outputs the derived set of operations. Further, the operation support apparatus 200 may receive time information indicating a time window immediately before the time window in which the set of operations are predicted, and the designation of an operation(s) for the target system and external environment data in the time information, and predict and output the state of the target system by using the already-trained simulator 216. Therefore, it is assumed that the operation presentation unit 270 performs at least one of displaying the state of the target system and presenting an appropriate action pattern for operation support for the operator.

Figure 6:
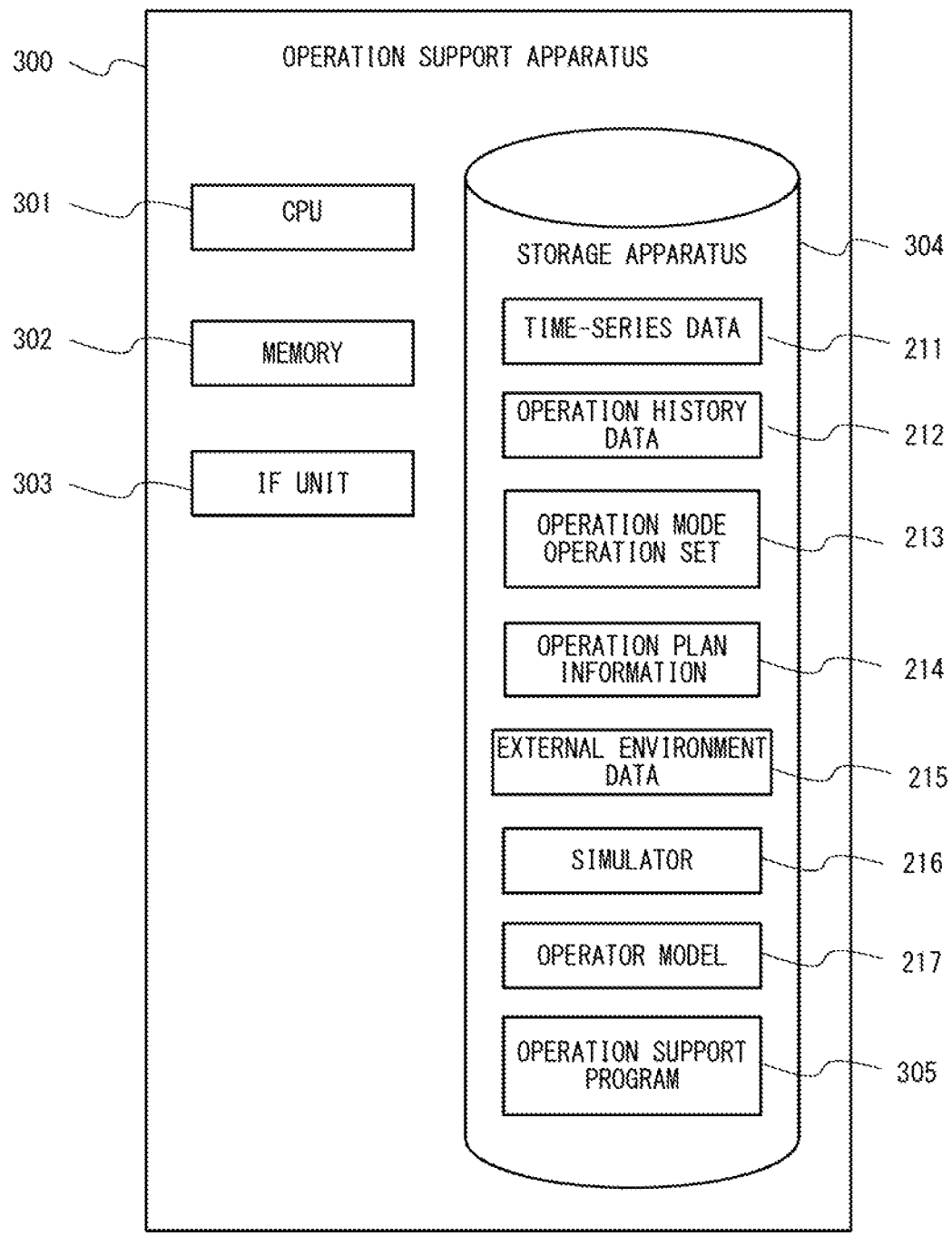
FIG. 6 is a block diagram showing a hardware configuration of the operation support apparatus according to the second example embodiment.

FIG. 6 is a block diagram showing a hardware configuration of an operation support apparatus 300 according to the second example embodiment. The operation support apparatus 300 is one that is obtained by implementing the above-described operation support apparatus 200 by hardware. The operation support apparatus 300 includes at least a CPU 301, a memory 302, an IF (interface) unit 303, and a storage device 304. The storage device 304 is a storage device such as a hard disk drive, a flash memory, or the like, corresponding to the above-described storage unit 210. In addition to the time-series data 211, the operation history data 212, the operating-mode operation set 213, the operation-plan information 214, the external environment data 215, the simulator 216, and the operator model 217 described above with reference to FIG. 3, the storage device 304 stores an operation support program 305 (illustration of which is omitted in FIG. 3). The operation support program 305 is a computer program in which the processes in the operation support method according to this example embodiment are implemented.

The memory 302 is a volatile storage device such as a RAM (Random Access Memory), and is a storage area in which information is temporarily held during the operation of the CPU 301. The IF unit 303 is an interface through which the operation support apparatus 300 externally receive/output data. For example, the IF unit 303 receives an operator's operation through an input device (not shown) such as a keyboard, a mouse, or a touch panel, and outputs the received operation details to the CPU 301. Further, in response to an instruction from the CPU 301, the IF unit 303 outputs data to a touch panel, a display device, a printer, or the like (not shown).

The CPU 301 is a processor, i.e., a control apparatus that controls each of the components in the operation support apparatus 300. The CPU 301 loads the operation support program 305 from the storage device 304 into the memory 302, and executes the loaded operation support program 305. In this way, the CPU 301 implements the functions of the specification unit 220, the operation-set generation unit 230, the classification information generation unit 240, the learning unit 250, the model generation unit 260, and the operation presentation unit 270.

Figure 7:
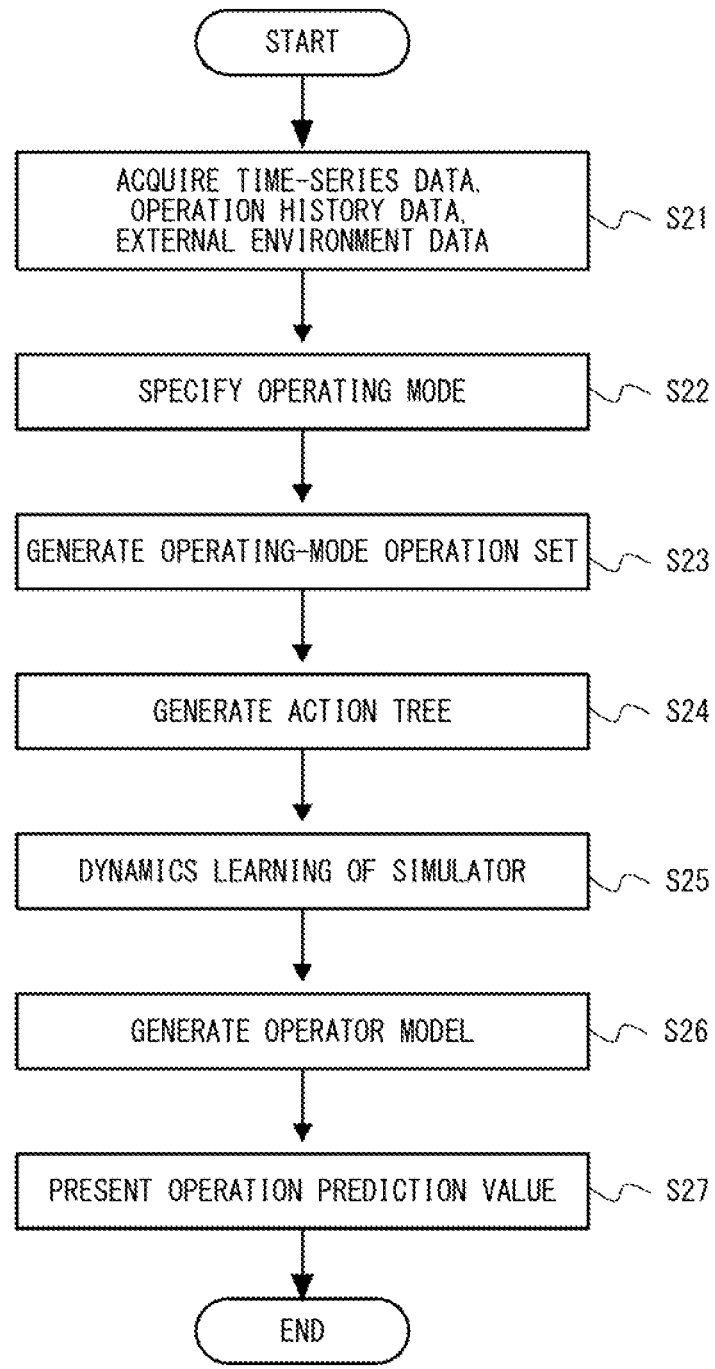
FIG. 7 is a flowchart for explaining a flow of an operation support method according to the second example embodiment.

FIG. 7 is a flowchart for explaining a flow of an operation support method according to the second example embodiment. Firstly, the specification unit 220 reads, i.e., acquires, the time-series data 211, the operation history data 212, and the external environment data 215 from the storage unit 210 (S21). Next, the specification unit 220 specifies an operating mode (S22). Specifically, the specification unit 220 first performs a pattern analysis on the time-series data 211. As the pattern analysis, the specification unit 220 may use, for example, a Wavelet transform, a Fourier transform, a Hidden Markov Model (HMM: Hidden Markov Model), or the like, but the pattern analysis is not limited to those using these examples. Further, the pattern is an example of the change trend of states. Further, the specification unit 220 specifies a change point in the analyzed pattern. Then, the specification unit 220 calculates similarity between patterns, and specifies patterns whose change trends have a degree of similarity therebetween equal to or higher than a predetermined value as operating modes of the same type. Further, the specification unit 220 integrates two or more patterns adjacent to each other into one pattern when a degree of similarity therebetween is equal to or higher than a predetermined value, and specifies a time at a boundary of the integrated pattern as a change point. Therefore, it can be considered that the specification unit 220 regards a part of a pattern at a boundary thereof as a boundary of an operating mode or a boundary of an action performed by an operator.

Figure 8:
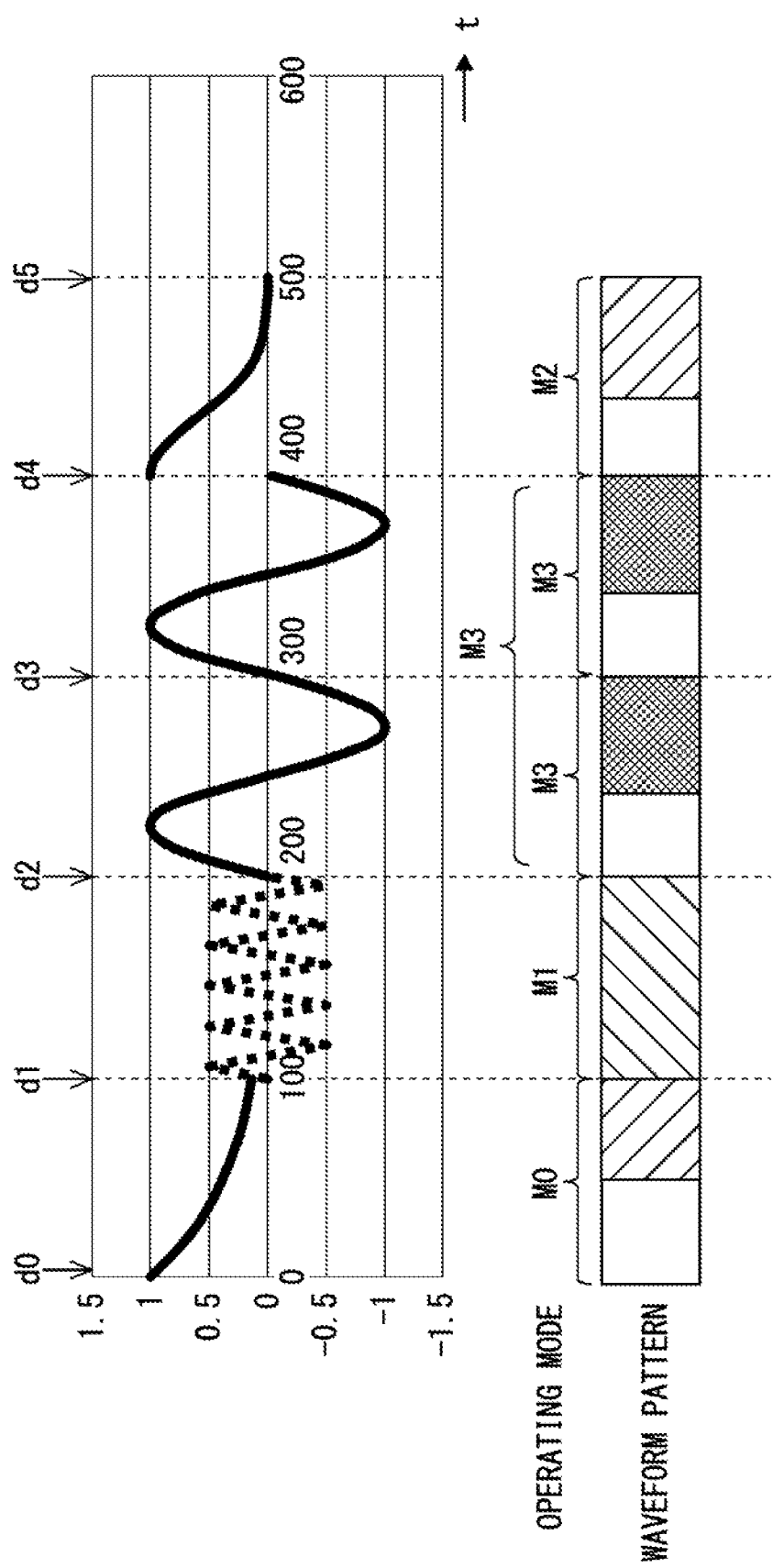
FIG. 8 is a diagram for explaining a concept of a pattern analysis and a specification of an operating mode of time-series data according to the second example embodiment.

FIG. 8 is a diagram for explaining a concept of a pattern analysis of time-series data and a specification of an operating mode according to the second example embodiment. A graph shown in the upper part in FIG. 8 shows changes of states over time in which the horizontal axis represents measurement times and the vertical axis represents states of time-series data. In this case, it is assumed that the specification unit 220 has specified change points d0 to d5 by a pattern analysis. Therefore, it is assumed that a waveform pattern shown in the lower part of FIG. 8 is specified. Then, the specification unit 220 integrates patterns as appropriate according to the similarity between waveform patterns adjacent each other, and specifies the integrated patterns as operating modes M0 to M3. In this example, for example, two waveform patterns are integrated as an operating mode M0, and an operating mode M1 includes one waveform pattern. Further, an operating mode M3 shows an example in which two waveform patterns are integrated with each other and the integrated waveform patterns are also integrated with each other. Further, the set of waveform patterns constituting the operating mode M0 is the same as that for the operating mode M2. However, since their constituting ratios are different from each other, their similarity is lower than a predetermined value, so that they are specified as different operating modes.

FIG. 9 shows an example of specifications of operating modes according to the second example embodiment. FIG. 9 shown an example in which the specification unit 220 specifies change points d0, d1, d2, . . . , dn−1 and do (n is an integer equal to or larger than two) as change points for the time-series data 211, and specifies time windows between these change points as operating modes M11, M12, . . . , and Mn.

The description will be continued by referring to FIG. 7 again. Next, the operation-set generation unit 230 generates an operating-mode operation set 213 (S23). For example, the operation-set generation unit 230 performs clustering by using the operation history data 212 as correct labels. For example, Softmax or the like can be used as the clustering, but the clustering is not limited to this example. Further, the operation-set generation unit 230 classifies each of the operations in the operation history data 212 into one of the operating modes by the clustering. That is, the operation-set generation unit 230 sorts out each of the operations into an operating mode corresponding to a time window to which the time at which that operation was performed belongs. Note that when there is no operation that is sorted out into the operating mode, i.e., when there is no history of operations performed at the time belonging to the time window of the operating mode, the operation-set generation unit 230 may classify the operation instruction 2143 in the corresponding time window 2142 as an operation. Then, the operation-set generation unit 230 generates an operating-mode operation set 213 by associating a set of operation classified into its respective operating mode with the operating mode, and stores the generated operating-mode operation set 213 in the storage unit 210.

FIG. 10 shows an example of operating-mode operation sets 213 according to the second example embodiment. FIG. 10 shows an example in which: operation sets $a_{1-1}$, $a_{1-2}$, and $a_{1-3}$ are associated with an operating mode M11; an operation set $a_{2-1}$ is associated with an operating mode M12; and operation sets $a_{n-1}$ and $a_{n-2}$ are associated with an operating mode Mn.

The description will be continued by referring to FIG. 7 again. Next, the classification information generation unit 240 classifies each of the operating modes in the operating-mode operation set 213 by using a plurality of environment indexes in the external environment data 215 as branching conditions, and thereby generates an action tree (S24). The classification information generation unit 240 may store the generated action tree in the storage unit 210 or output it to a display apparatus (not shown). Further, the step S24 is not indispensable.

Figure 11:
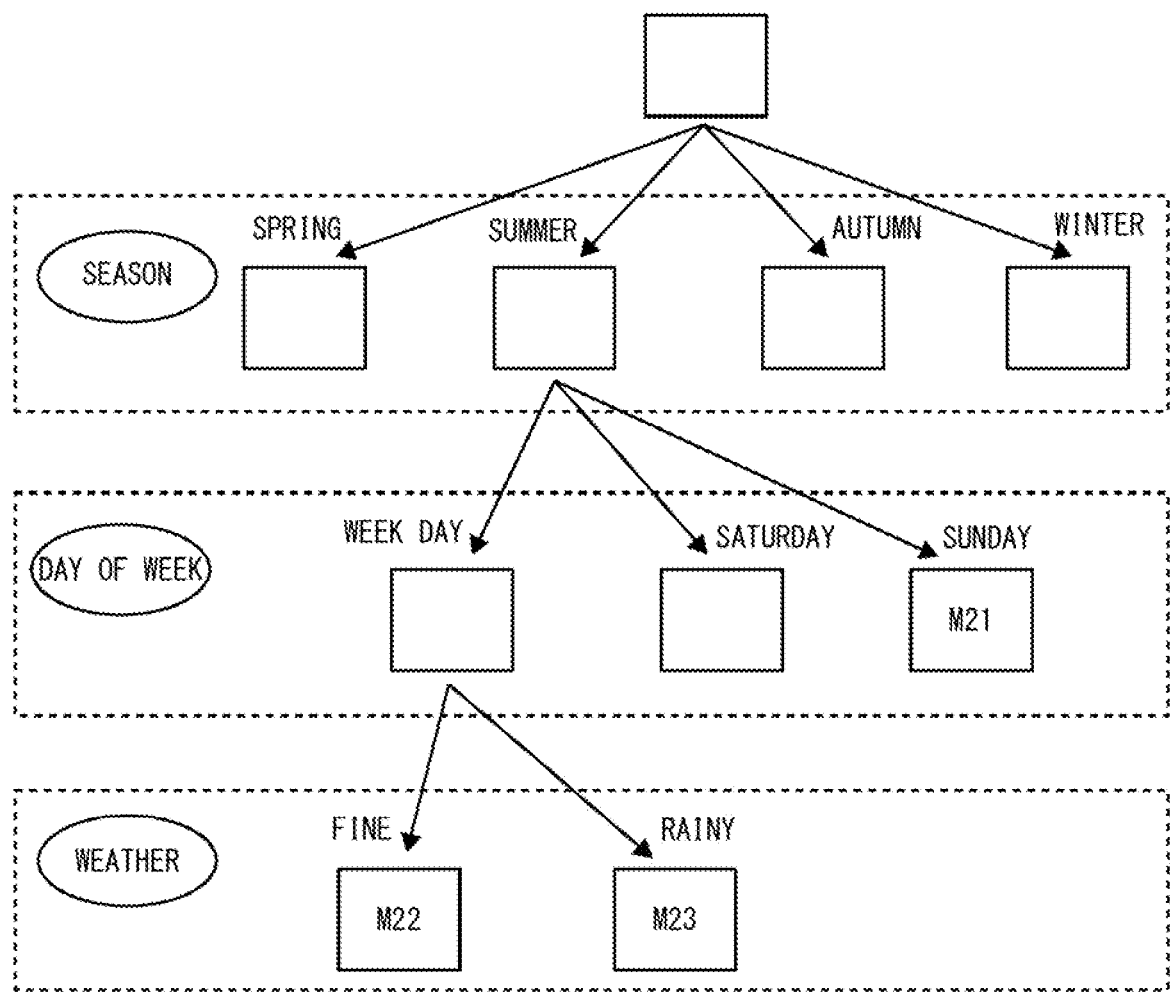
FIG. 11 shows an example of an action tree according to the second example embodiment.

FIG. 11 shows an example of the action tree according to the second example embodiment. In this example, the classification information generation unit 240 uses data about seasons, days of the week, and weathers in the past, which are environment indexes, as the external environment data 215, and classifies each of the operating modes in the operating-mode operation set 213 into a node in which the date and time, which are a combination of these data, coincide with the time window of that operating mode. Therefore, the operator can specify an appropriate operating mode by tracing back, for the given external environment (in the plan information), the action tree according to the branching condition. Then, the operator can understand a set of operations associated with the specified operating mode by referring to the operating-mode operation set 213. Note that the parent-child relation of the branching conditions in the action tree is not limited to the above-described example.

The description will be continued by referring to FIG. 7 again. After that, the learning unit 250 performs dynamics learning of parameters of the simulator 216 by using the time-series data 211, the operation history data 212, the operating-mode operation set 213, the operation-plan information 214, the external environment data 215, and the action tree (S25). Therefore, the parameters are optimized. The learning unit 250 stores (updates) the trained simulator 216 in the storage unit 210.

Specifically, the simulator 216 may be defined as shown below. Note that it is assumed that the time-series data 211 is defined as the below-shown Expression (1). Note that flow rates p and pressures q are measured values of the target system, and locations r are places where these measured values are obtained (locations), and measurement times are represented by t.

[Expression 1]

$$s_t = \begin{pmatrix} p_t \\ q_t \end{pmatrix} \quad (1)$$

Note that the Expression (1) can be expressed as the below-shown Expression (2) by differentiation with respect to the time. Note that the action "a" corresponds to a set of operations performed by the operator, and "i" represents identification information of the location. Further, "ω" represents a frequency used in a scalogram or a Fourier transform used in a Wavelet transform.

[Expression 2]

$$\dot{s} = \frac{ds}{dt} \quad (2)$$
$$= P(s_{t+1} | s_t, a, r_i)$$
$$:= P(s_{t+1} | s_t, \omega, r_i) P(\omega | a)$$

Further, the learning unit 250 can define and train the simulator 216 by using the Expression (2) as a Gaussian process GP (μ,K(s,s');a). Note that the learning unit 250 may train the simulator 216 by a CNN (Convolutional Neural Network), an RNN (Recurrent Neural Network), or the like.

Then, the model generation unit 260 generates an operator model 217 for each of the operating modes included in the operating-mode operation set 213 (S26), and stores the generated operator models 217 in the storage unit 210. For example, the model generation unit 260 may generate the operator model 217 by using the time-series data 211, the operation history data 212, the operating-mode operation set 213, the operation-plan information 214, the external environment data 215, and the simulator 216.

Note that the step S24 may be performed together with the step S26.

After that, the operation presentation unit 270 acquires a set of operations by using the operator model 217 corresponding to the operating mode, and presents the acquired set of operations to the operator (S27). For example, the operation presentation unit 270 specifies an operator model 217 corresponding to an externally-input operating mode according to that operating mode, and derives and outputs a set of operations by using the specified operator model 217. Alternatively, the operation presentation unit 270 externally receives the designation of a target state of the target system in a time window in the future, and specifies an operator model 217 in an operating mode corresponding to the time window in the future. Then, the operation presentation unit 270 inputs the designated target state to the specified operator model 217, derives a set of operations therefrom, and outputs the derived set of operations.

As described above, in this example embodiment: an operating mode for each time period is estimated from time-series data; a prediction model for each operating mode is created; and a set of operations (correspond to the operating mode) is predicted from operation-plan information and presented to an operator. Therefore, even an inexperienced operator can obtain an appropriate set of operations from operation-plan information, and can operate an operation system or the like by using know-how of skilled operators.

Further, all the operations actually performed by operators are not necessarily recorded in the operation history data 212. For example, the target system may not have a mechanism for electronically recording operation details. In such a case, for example, a history of operations recorded by handwriting is separately digitized and stored as operation history data 212 in the storage unit 210. Alternatively, even if the target system has a mechanism for electronically recording operation details, in some cases, it is impossible to store the operation history data 212 for all the time windows because of the capacity of the target system or the storage unit 210. In such cases, the operation history data 212 is partially stored.

In such a case, there is a possibility that each facility may be operated based on the experience of an operator of that facility and operated differently from the operation-plan information 214. For example, there is a possibility that the operation instruction 2143 is performed in a time window different from the time window 2142. Alternatively, there is a possibility that the operation instruction 2143 is not provided in the time window 2142, and/or an operation other than the operation instruction 2143 is performed in the time window 2142. Further, no specific time within the time window 2142 is specified. Further, there is a high possibility that the operation instruction 2143 is not a detailed instruction, and an optimum setting value for each facility is unknown. In particular, it has been considered that the optimum operation timing and the detailed settings change because of the facilities, the surrounding environment thereof, and the operation performed at that moment in the related facility. However, in many cases, it is difficult to incorporate these information items (i.e., know-how) into the operation plan under the existing technology. Therefore, it is difficult for an inexperienced operator to specify appropriate operation details from the operation-plan information 214.

Therefore, in this example embodiment, separation points for operating modes are specified by analyzing the time-series data 211, and a set of performed operations is associated with one of the operating modes. In this way, it is possible to clarify the actual state of the operation in each facility and to check a difference from the operation plan. Therefore, it is possible to clarify operations that are not included in the operation instructions and/or the presence or the like of an operating mode that is not assumed in the operation plan but is indispensable in the actual site, and thereby to perform feedback to the operation plan. Further, it is possible extract an operation(s) that is highly related to the operating mode from enormous operation history. In some cases, there is a possibility that a fact that a conventionally-performed operation does not actually contribute to the target state is discovered. Further, operations that neither remain in the operation history nor are included in the operation instructions are not included in the operating mode set of operations. However, know-how can be efficiently obtained by doing hearing or the like from skilled operators based on the operating-mode operation set.

Other Example Embodiment

Note that, in the above example embodiment, each of the elements that are shown in the drawings as functional blocks for performing various processes can be implemented by hardware such as a CPU (Central Processing Unit), a memory, and other types of circuits, or can be implemented by a software program(s) that the CPU loads into the memory and executes. Therefore, those skilled in the art will understand that these functional blocks can be implemented solely by hardware, solely by software, or a combination thereof. That is, they are limited to neither hardware nor software.

Further, the above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Compact Disc-Read Only Memory), a CD-R, a CD-R (CD-Recordable), a CD-R/W (CD-ReWritable), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Note that the present disclosure is not limited to the above-described example embodiments, and they may be modified as appropriate without departing from the spirit of the present disclosure. Further, the present disclosure may be implemented by combining at least two of the example embodiments with one another as desired.

The whole or unit of the example embodiments disclosed above can be described as, but not limited to, the following supplementary notes.

(Supplementary Note A1)

An operation support apparatus comprising:

a storage unit configured to store time-series data obtained by measuring states of a target system controlled according to a plurality of operations performed by an operator, and operation information, the operation information being a set of at least one of the plurality of operations and a time;

a specification unit configured to specify a plurality of change points in a change trend of the states from the time-series data, and specify each of a plurality of time windows as one of a plurality of operating modes in the target system, the plurality of time windows being separated at at least one of the plurality of change points; and an operation-set generation unit configured to extract, for each of the plurality of time windows, a set of operations performed at a time included in that time window from the operation information, generate an operating-mode operation set in which the operating modes corresponding to the respective time windows are associated with the extracted set of operations, and store the generated operating-mode operation set in the storage unit.

(Supplementary Note A2)

The operation support apparatus described in Supplementary note A1, wherein the specification unit:

specifies each of a plurality of patterns that are obtained from the time-series data by performing a pattern analysis thereon as a change trend of the states; and specifies a time at a boundary of each of the patterns as the change point.

(Supplementary Note A3)

The operation support apparatus described in Supplementary note A2, wherein the specification unit specifies, among the plurality of patterns, patterns whose change trends have a degree of similarity therebetween equal to or higher than a predetermined value as operating modes of the same type.

(Supplementary Note A4)

The operation support apparatus described in Supplementary note A2 or A3, wherein the specification unit:

integrates two or more patterns adjacent to each other into one pattern when a degree of similarity between their change trends is equal to or higher than a predetermined value; and specifies a time at a boundary of the integrated pattern as the change point.

(Supplementary Note A5)

The operation support apparatus described in any one of Supplementary notes A1 to A4, wherein the operation information includes history information of at least one of a plurality of operations performed by the operator and an operation instruction for the operator based on an operation plan that is planned in advance within a period corresponding to the time-series data, and the operation-set generation unit:

extracts a set of operations performed in the time window; and extracts an operation instruction corresponding to the time window from the operation instructions when no operation corresponding to the time window exists in the operation information, and generates the operating-mode operation set by associating the extracted operation instruction with the operating mode corresponding to the time window.

(Supplementary Note A6)

The operation support apparatus described in any one of Supplementary notes A1 to A5, wherein the storage unit further stores external environment data including a plurality of pieces of environment data each of which corresponds to a respective one of a plurality of environment indexes, and the operation support apparatus further includes a tree generation unit configured to generate an action tree in which each of the operating modes is classified by using each of the plurality of environment indexes as a branching condition.

(Supplementary Note A7)

The operation support apparatus described in Supplementary note A6, wherein the tree generation unit generates and outputs the action tree as visualization information.

(Supplementary Note A8)

The operation support apparatus described in any one of Supplementary notes A1 to A5, further comprising a visualization unit configured to generate and output visualization information of the operating-mode operation set.

(Supplementary Note A9)

The operation support apparatus described in any one of Supplementary notes A1 to A8, further comprising a model generation unit configured to generate, based on the time-series data and the operating-mode operation set, an operator model for each of the operating modes, the operator model being configured to derive a set of operations performed by the operator from the state of the target system.

(Supplementary Note A10)

The operation support apparatus described in Supplementary note A9, further comprising an operation presentation unit configured to input, in response to the designation of a target state of the target system in a time window in the future, the target state to the operator model in the operating mode corresponding to the time window in the future, derive a set of operations therefrom, and output the derived set of operations.

(Supplementary Note A11)

The operation support apparatus described in Supplementary note A9 or A10, further comprising a learning unit configured to train a simulator for predicting a state of the target system by using the time-series data and the operating-mode operation set, and wherein the model generation unit generates the operator model based also on the trained simulator.

(Supplementary Note B1)

An operation support system comprising:

a storage unit configured to store time-series data obtained by measuring states of a target system controlled according to a plurality of operations performed by an operator, and operation information, the operation information being a set of at least one of the plurality of operations and a time;

a specification unit configured to specify a plurality of change points in a change trend of the states from the time-series data, and specify each of a plurality of time windows as one of a plurality of operating modes in the target system, the plurality of time windows being separated at at least one of the plurality of change points; and an operation-set generation unit configured to extract, for each of the plurality of time windows, a set of operations performed at a time included in that time window from the operation information, generate an operating-mode operation set in which the operating modes corresponding to the respective time windows are associated with the extracted set of operations, and store the generated operating-mode operation set in the storage unit.

(Supplementary Note B2)

The operation support system described in Supplementary note B1, wherein the specification unit:

specifies each of a plurality of patterns that are obtained from the time-series data by performing a pattern analysis thereon as a change trend of the states; and specifies a time at a boundary of each of the patterns as the change point.

(Supplementary Note C1)

An operation support method wherein a computer performs processes including:

specifying, from time-series data obtained by measuring states of a target system controlled according to a plurality of operations performed by an operator, a plurality of change points in a change trend of the states;

specifying each of a plurality of time windows as one of a plurality of operating modes in the target system, the plurality of time windows being separated at at least one of the plurality of change points;

extracting, for each of the plurality of time windows, a set of operations performed at a time included in that time window from operation information, the operation information being a set of at least one of the plurality of operations and a time;

generating an operating-mode operation set in which the operating modes corresponding to the respective time windows are associated with the extracted set of operations, and storing the generated operating-mode operation set in a storage device.

(Supplementary Note D1)

A non-transitory computer readable medium storing an operation support program for causing a computer to perform:

a process of specifying, from time-series data obtained by measuring states of a target system controlled according to a plurality of operations performed by an operator, a plurality of change points in a change trend of the states;

a process of specifying each of a plurality of time windows as one of a plurality of operating modes in the target system, the plurality of time windows being separated at at least one of the plurality of change points;

a process of extracting, for each of the plurality of time windows, a set of operations performed at a time included in that time window from operation information, the operation information being a set of at least one of the plurality of operations and a time;

a process of generating an operating-mode operation set in which the operating modes corresponding to the respective time windows are associated with the extracted set of operations, and a process of storing the generated operating-mode operation set in a storage device.

Although the present disclosure has been described above with reference to the example embodiment (and examples), the present disclosure is not limited to the above-described example embodiment (and examples).

Various modifications that can be understood by those skilled in the art can be made to the configuration and details of the present disclosure within the scope of the present disclosure.

REFERENCE SIGNS LIST

100 OPERATION SUPPORT APPARATUS
110 STORAGE UNIT
111 TIME-SERIES DATA
112 OPERATION INFORMATION
113 OPERATION MODE OPERATION SET
120 SPECIFICATION UNIT
130 OPERATION SET GENERATION UNIT
200 OPERATION SUPPORT APPARATUS
210 STORAGE UNIT
211 TIME-SERIES DATA
212 OPERATION HISTORY DATA
213 OPERATION MODE OPERATION SET
214 OPERATION PLAN INFORMATION
2141 TARGET STATE
2142 TIME PERIOD
2143 OPERATION INSTRUCTION
215 EXTERNAL ENVIRONMENT DATA
216 SIMULATOR
217 OPERATOR MODEL
220 SPECIFICATION UNIT
230 OPERATION SET GENERATION UNIT
240 CLASSIFICATION INFORMATION GENERATION UNIT
250 LEARNING UNIT
260 MODEL GENERATION UNIT
270 OPERATION PRESENTATION UNIT
300 OPERATION SUPPORT APPARATUS
301 CPU
302 MEMORY
303 IF UNIT
304 STORAGE APPARATUS
305 OPERATION SUPPORT PROGRAM
D0 CHANGE POINT
D1 CHANGE POINT
D2 CHANGE POINT
D3 CHANGE POINT
D4 CHANGE POINT
D5 CHANGE POINT
M0 OPERATING MODE
M1 OPERATING MODE
M2 OPERATING MODE
M3 OPERATING MODE
M11 OPERATING MODE
M12 OPERATING MODE
M21 OPERATING MODE
M22 OPERATING MODE
M23 OPERATING MODE
MN OPERATING MODE

What is claimed is:

1. An operation support apparatus comprising:
at least one memory configured to store instructions and time-series data obtained by measuring states of a target system controlled according to a plurality of operations performed by an operator, and operation information, the operation information being a set of at least one of the plurality of operations and a time, and
at least one processor configured to execute the instructions to:
specify a plurality of change points in a change trend of the states from the time-series data, and specify each of a plurality of time windows as one of a plurality of operating modes in the target system, the plurality of time windows being separated at at least one of the plurality of change points; and
extract, for each of the plurality of time windows, a set of operations performed at a time included in that time window from the operation information, generate an operating-mode operation set in which the operating modes corresponding to the respective time windows are associated with the extracted set of operations, and store the generated operating-mode operation set in the storage unit.

2. The operation support apparatus according to claim 1, wherein the at least one processor further configured to execute the instructions to:
specify each of a plurality of patterns that are obtained from the time-series data by performing a pattern analysis thereon as a change trend of the states; and
specify a time at a boundary of each of the patterns as the change point.

3. The operation support apparatus according to claim 2, wherein the at least one processor further configured to execute the instructions to specify, among the plurality of patterns, patterns whose change trends have a degree of similarity therebetween equal to or higher than a predetermined value as operating modes of the same type.

4. The operation support apparatus according to claim 2, wherein the at least one processor further configured to execute the instructions to:

integrate two or more patterns adjacent to each other into one pattern when a degree of similarity between their change trends is equal to or higher than a predetermined value; and specify a time at a boundary of the integrated pattern as the change point.

5. The operation support apparatus according to claim 1, wherein the operation information includes history information of at least one of a plurality of operations performed by the operator and an operation instruction for the operator based on an operation plan that is planned in advance within a period corresponding to the time-series data, and wherein the at least one processor further configured to execute the instructions to:

extract a set of operations performed in the time window; and extract an operation instruction corresponding to the time window from the operation instructions when no operation corresponding to the time window exists in the operation information, and generate the operating-mode operation set by associating the extracted operation instruction with the operating mode corresponding to the time window.

6. The operation support apparatus according to claim 1, wherein the at least one memory further configured to store external environment data including a plurality of pieces of environment data each of which corresponds to a respective one of a plurality of environment indexes, and generate an action tree in which each of the operating modes is classified by using each of the plurality of environment indexes as a branching condition.

7. The operation support apparatus according to claim 6, wherein the at least one processor further configured to execute the instructions to generate and outputs the action tree as visualization information.

8. The operation support apparatus according to claim 1, wherein the at least one processor further configured to execute the instructions to generate and output visualization information of the operating-mode operation set.

9. The operation support apparatus according to claim 1, wherein the at least one processor further configured to execute the instructions to generate, based on the time-series data and the operating-mode operation set, an operator model for each of the operating modes, the operator model being configured to derive a set of operations performed by the operator from the state of the target system.

10. The operation support apparatus according to claim 9, wherein the at least one processor further configured to execute the instructions to input, in response to the designation of a target state of the target system in a time window in the future, the target state to the operator model in the operating mode corresponding to the time window in the future, derive a set of operations therefrom, and output the derived set of operations.

11. The operation support apparatus according to claim 9, wherein the at least one processor further configured to execute the instructions to train a simulator for predicting a state of the target system by using the time-series data and the operating-mode operation set, and generate the operator model based also on the trained simulator.

12. An operation support method wherein a computer performs processes including:

specifying, from time-series data obtained by measuring states of a target system controlled according to a plurality of operations performed by an operator, a plurality of change points in a change trend of the states;

specifying each of a plurality of time windows as one of a plurality of operating modes in the target system, the plurality of time windows being separated at at least one of the plurality of change points;

extracting, for each of the plurality of time windows, a set of operations performed at a time included in that time window from operation information, the operation information being a set of at least one of the plurality of operations and a time;

generating an operating-mode operation set in which the operating modes corresponding to the respective time windows are associated with the extracted set of operations, and storing the generated operating-mode operation set in a storage device.

13. A non-transitory computer readable medium storing an operation support program for causing a computer to perform:

a process of specifying, from time-series data obtained by measuring states of a target system controlled according to a plurality of operations performed by an operator, a plurality of change points in a change trend of the states;

a process of specifying each of a plurality of time windows as one of a plurality of operating modes in the target system, the plurality of time windows being separated at at least one of the plurality of change points;

a process of extracting, for each of the plurality of time windows, a set of operations performed at a time included in that time window from operation information, the operation information being a set of at least one of the plurality of operations and a time;

a process of generating an operating-mode operation set in which the operating modes corresponding to the respective time windows are associated with the extracted set of operations, and a process of storing the generated operating-mode operation set in a storage device.

* * * * *